(12) United States Patent
Cron et al.

(10) Patent No.: US 11,577,548 B2
(45) Date of Patent: Feb. 14, 2023

(54) REINFORCED RESILIENT SUPPORT FOR A NON-PNEUMATIC TIRE

(71) Applicants: COMPAGNIE GENERALE DES ETABLISSEMENTS MICHELIN, Clermont-Ferrand (FR); Steven M. Cron, Simpsonville, SC (US); Damon Lee Christenbury, Greenville, SC (US)

(72) Inventors: Steven M. Cron, Simpsonville, SC (US); Damon Lee Christenbury, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 183 days.

(21) Appl. No.: 16/954,457

(22) PCT Filed: Dec. 21, 2017

(86) PCT No.: PCT/US2017/067922
§ 371 (c)(1),
(2) Date: Jun. 16, 2020

(87) PCT Pub. No.: WO2019/125468
PCT Pub. Date: Jun. 27, 2019

(65) Prior Publication Data
US 2021/0078365 A1  Mar. 18, 2021

(51) Int. Cl.
*B60B 9/26* (2006.01)
*B60C 7/10* (2006.01)
*B60C 7/18* (2006.01)
*B60C 7/14* (2006.01)

(52) U.S. Cl.
CPC ............... *B60C 7/102* (2013.01); *B60C 7/18* (2013.01); *B60B 9/26* (2013.01); *B60C 7/146* (2021.08)

(58) Field of Classification Search
None
See application file for complete search history.

(56) References Cited

FOREIGN PATENT DOCUMENTS

| EP | 0132048 | 1/1985 |
|---|---|---|
| GB | 191516544 | 4/1916 |
| WO | WO2017072562 | 5/2017 |
| WO | WO2019/089008 A1 | 5/2019 |

OTHER PUBLICATIONS

International Search Report and Written Opinion Thereof, PCT Application No. of PCT/US2017/067922, dated Jul. 6, 2018, 16 pages.
European Office Action Corresponding to Application No. 17829559 dated Jul. 11, 2022.

*Primary Examiner* — Alexander S Thomas
(74) *Attorney, Agent, or Firm* — Dority & Manning, P.A.

(57) ABSTRACT

A support structure for a non-pneumatic tire and a tire incorporating such support structure. A support membrane extends continuously between a radially-inner end and a radially-outer end. Joints may be positioned at each end. An annular band may be connected with the radially-outer end. A wheel, hub, or other structure may be connected with the radially-inner end.

14 Claims, 7 Drawing Sheets

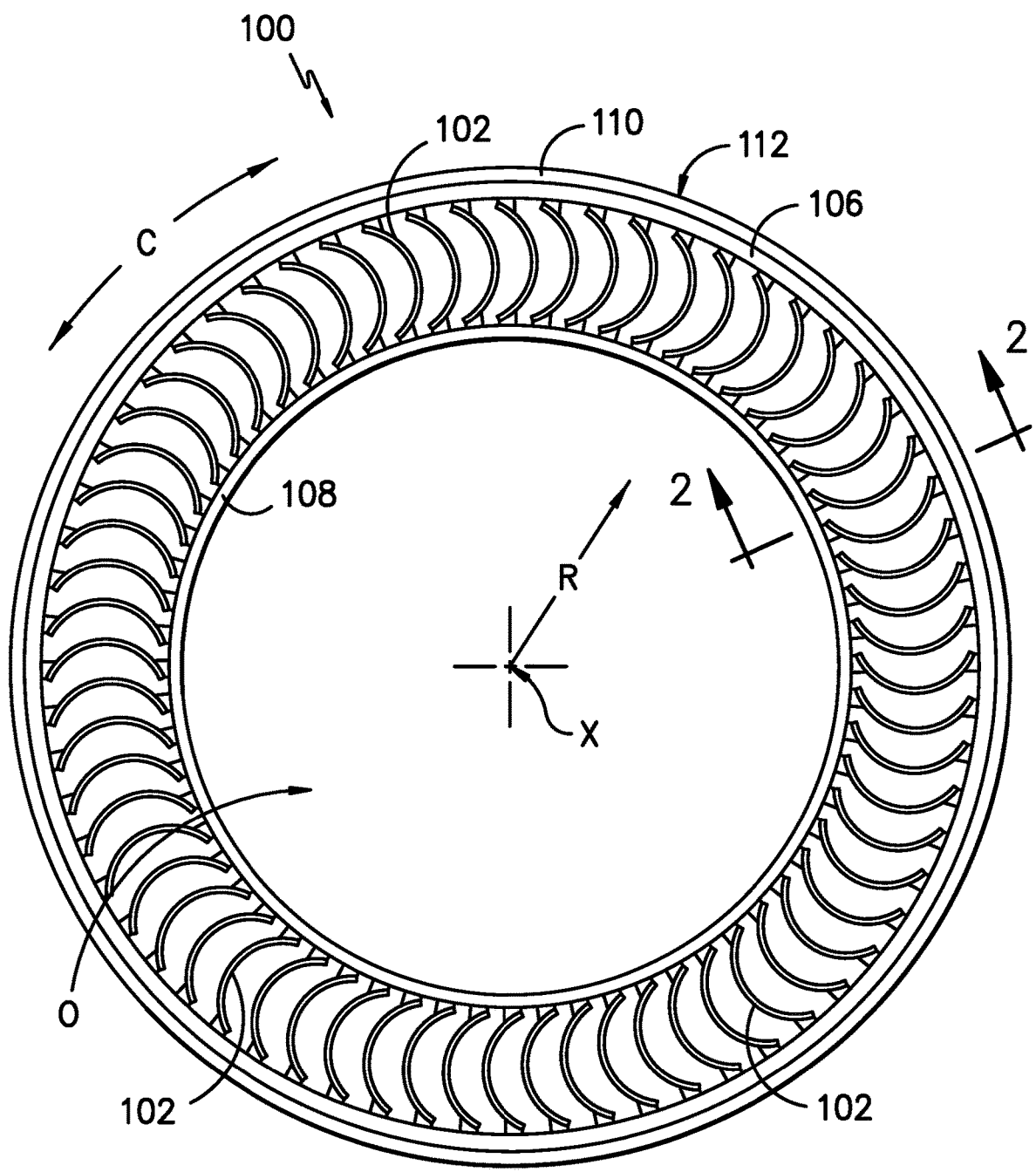
FIG. -1-

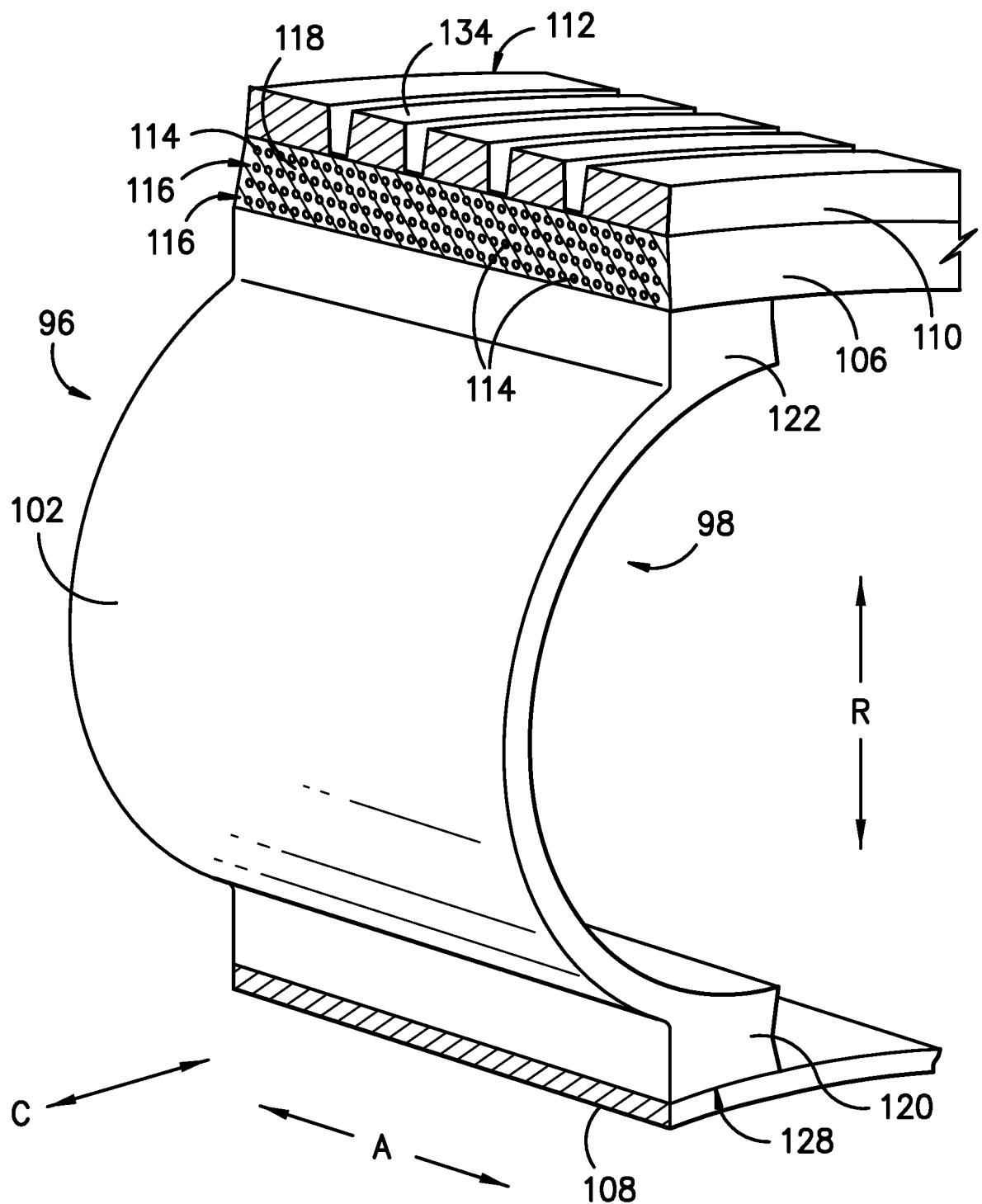
FIG. -2-

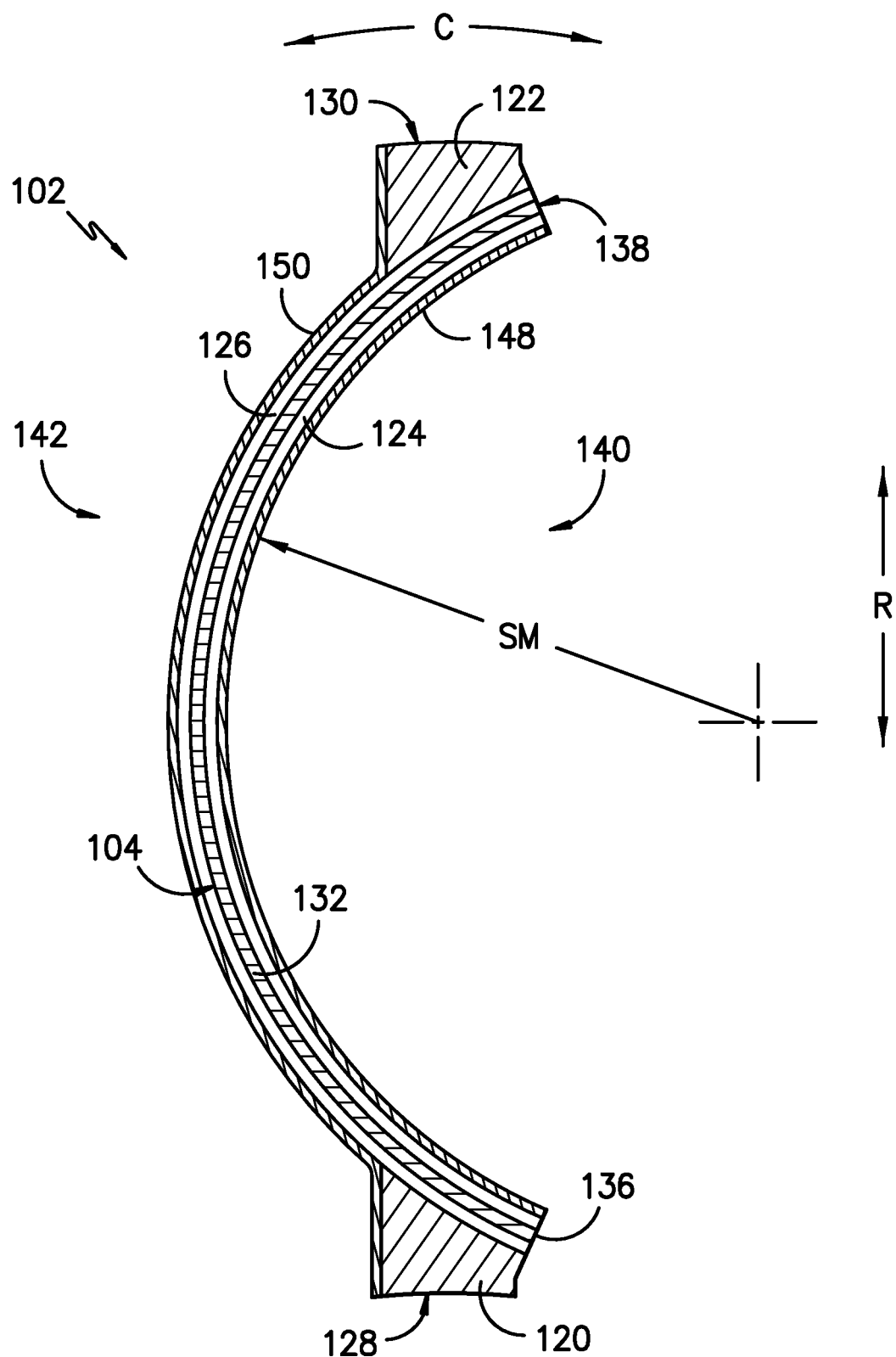
FIG. -3-

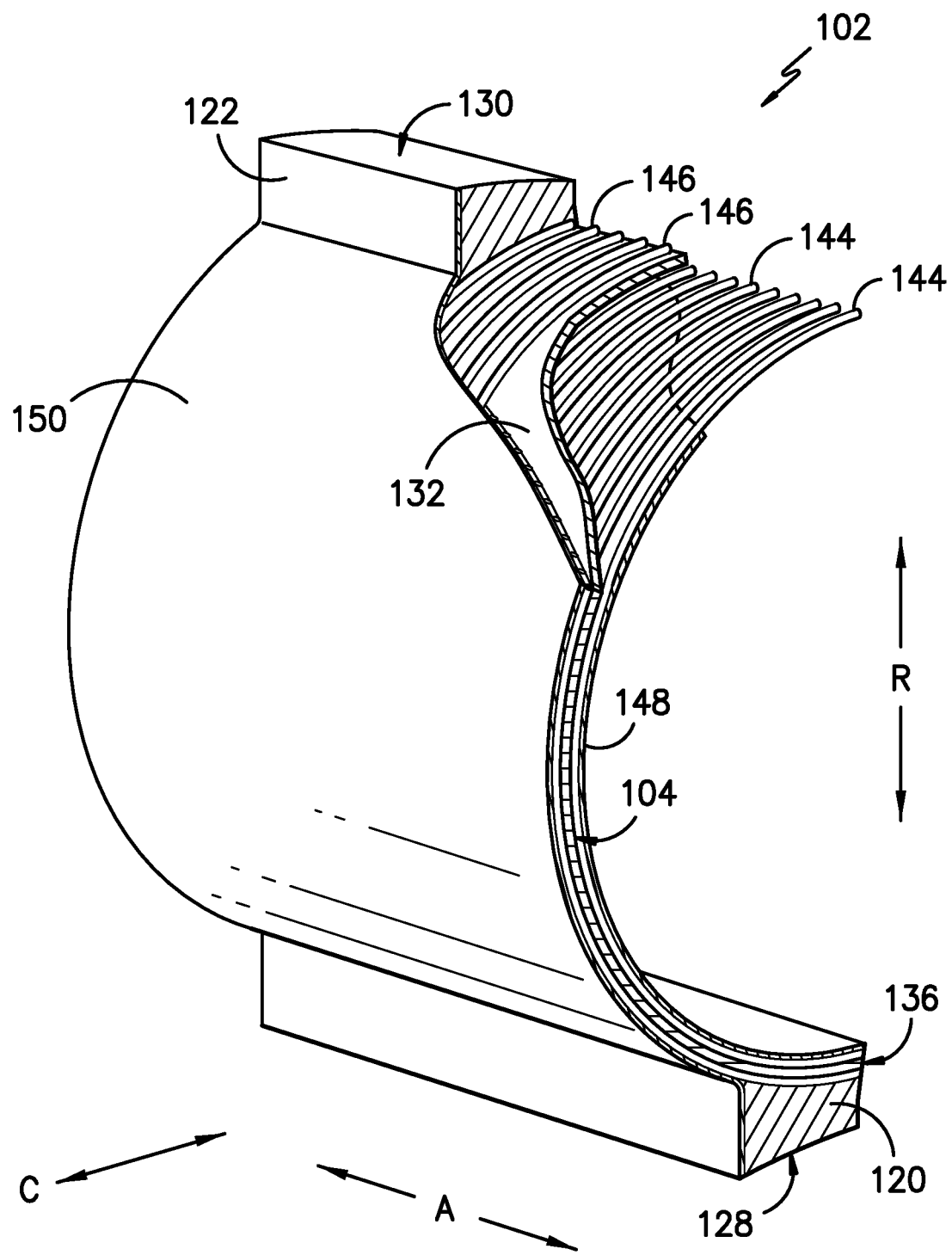
FIG. -4-

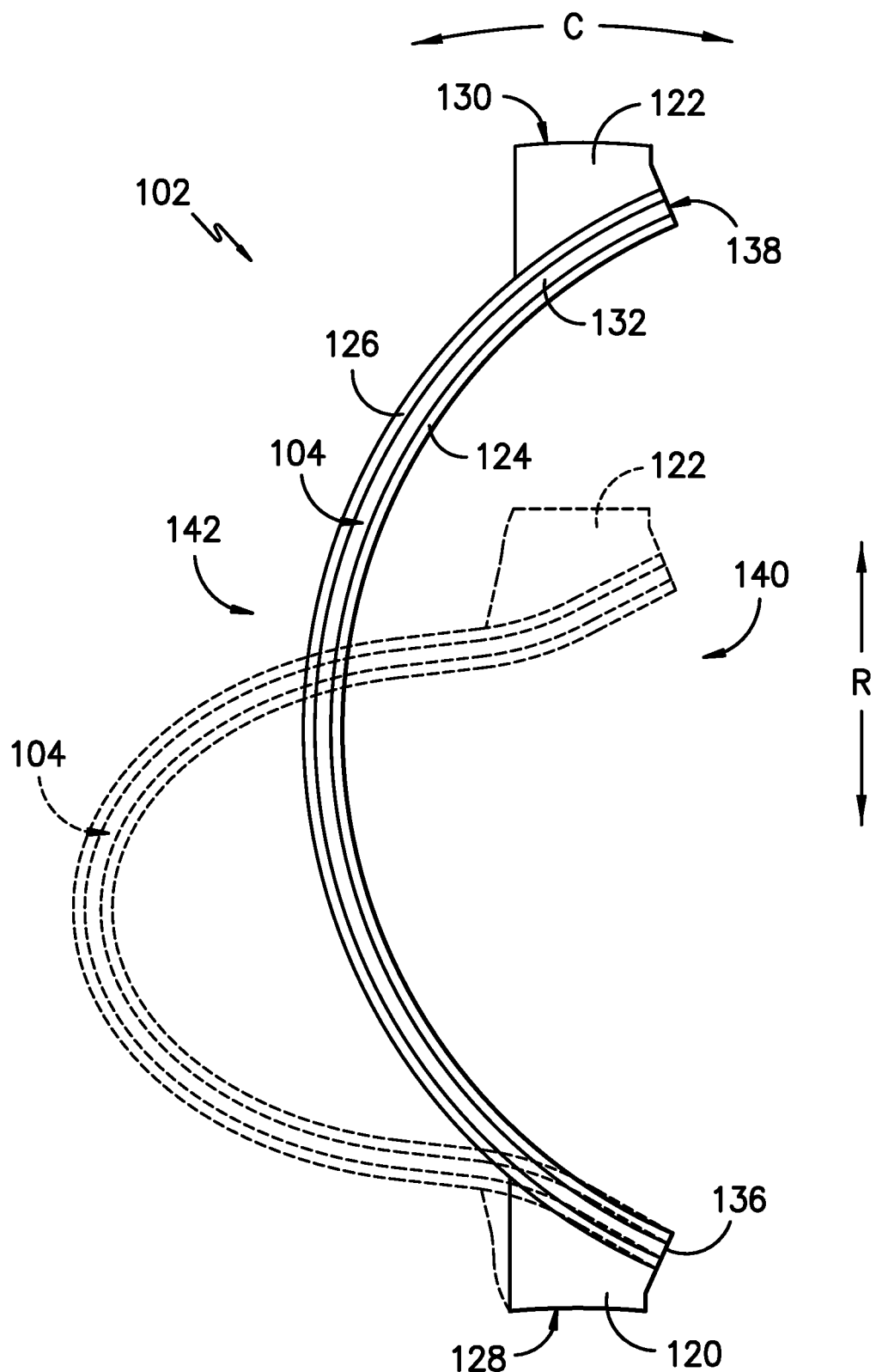
FIG. -5-

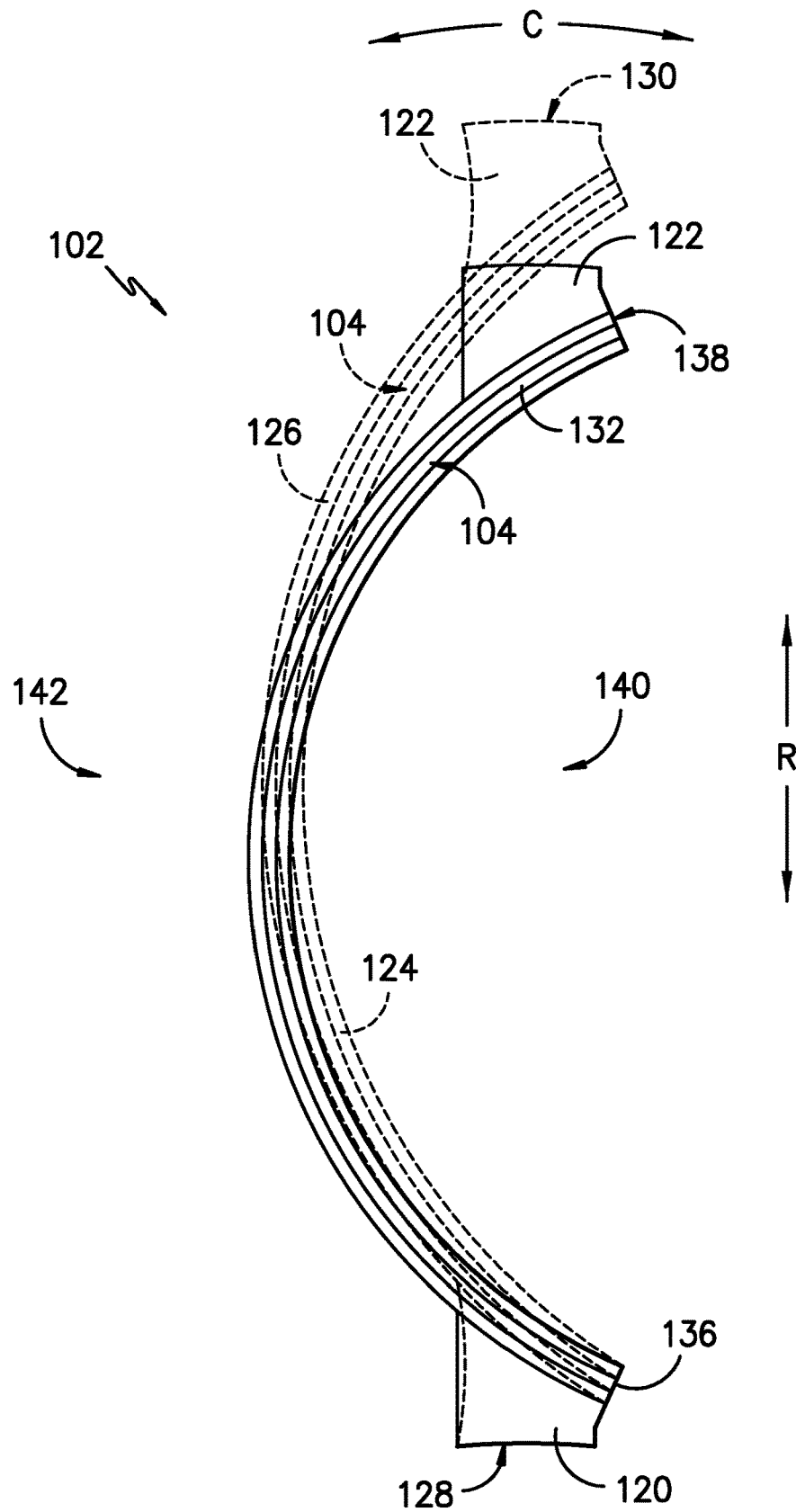
FIG. -6-

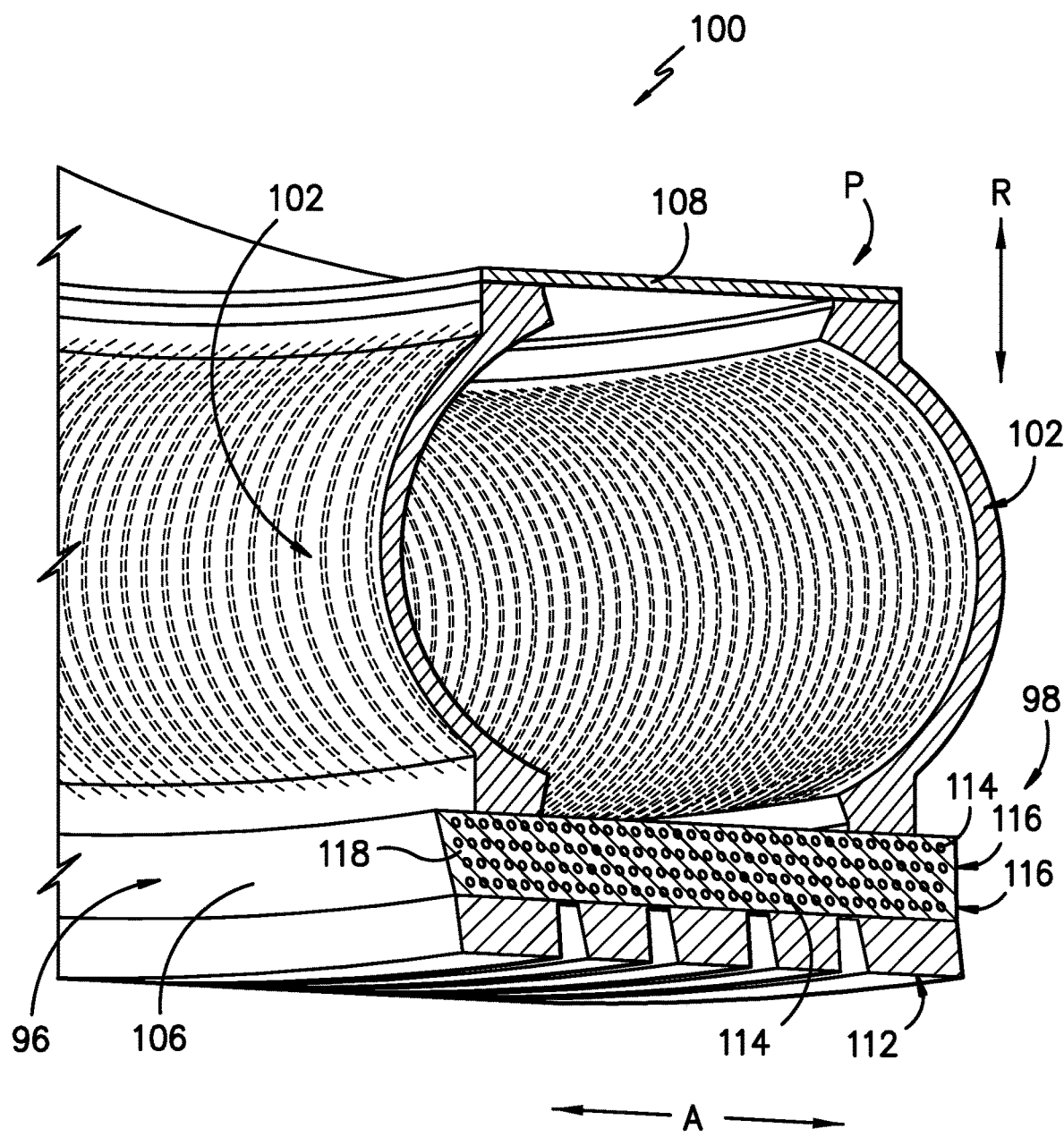
FIG. -7-

REINFORCED RESILIENT SUPPORT FOR A NON-PNEUMATIC TIRE

CROSS-REFERENCE TO RELATED APPLICATIONS

The present application is a §371 Application of PCT/US2017/067922 filed on Dec. 21, 2017, all of which is incorporated herein by reference for all purposes.

FIELD OF THE INVENTION

The subject matter of the present disclosure relates generally to a reinforced support or spoke for a tire and to a tire incorporating such support.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire or wheel constructions provide certain such improvements. The details and benefits of non-pneumatic tire or non-pneumatic wheel constructions are described in e.g., U.S. Pat. Nos. 6,769,465; 6,994,134; 7,013,939; and 7,201,194. Certain non-pneumatic tire and wheel constructions propose incorporating a resilient, annular shear band, embodiments of which are described in e.g., U.S. Pat. Nos. 6,769,465 and 7,201,194. Such non-pneumatic tire and wheel constructions provide advantages in performance without relying upon a gas inflation pressure for support of the nominal loads applied to the tire or wheel.

In some non-pneumatic constructions, vehicle load is applied to a wheel hub that is connected with an annular shear band through load bearing members in the form of e.g., multiple webs or spokes. These members can transmit the load to the annular shear band through e.g., tension, compression, or both. A layer of tread can be applied to the shear band to provide protection against the travel surface.

While non-pneumatic constructions have been proposed that provide various advantages, improvements in the ability of the non-pneumatic tire to carry loads and enhance passenger comfort while reducing mass and rolling resistance are still needed.

SUMMARY OF THE INVENTION

The present invention provides a support structure for a non-pneumatic tire and a tire incorporating such support structure. A support membrane extends continuously between a radially-inner end and a radially-outer end. Joints may be positioned at each end. An annular band may be incorporated with the radially-outer end. A wheel, hub, or other structure may be incorporated with the radially-inner end. Additional objects and advantages of the invention will be set forth in part in the following description, or may be apparent from the description, or may be learned through practice of the invention.

In one exemplary embodiment of the present invention, a resilient, composite structure for connecting with components of a tire is provided. The tire defines axial, radial, and circumferential directions. The composite structure includes a radially-outer joint for connecting with a first component of a tire and a radially-inner joint for connecting with a second component of a tire. A support membrane extends continuously between the radially-outer joint and the radially-inner joint. The support membrane has a radially-outer end that is located radially inward of the radially-outer joint. The support membrane has a radially-inner end that is located radially outward of the radially-inner joint. The radially-inner joint and the radially-outer joint are movable relative to teach other so as to bend the support membrane. The radially-inner joint and the radially-outer joint are both located on one of the opposing sides of the support membrane.

In another exemplary embodiment, the present invention includes a tire incorporating a plurality of such resilient, composite structures.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an elevation view of an exemplary tire of the present invention incorporated onto a cylindrically-shaped hub.

FIG. 2 illustrates a cross-sectional view of the exemplary tire of FIG. 1 taken along lines 2-2 of FIG. 1.

FIG. 3 illustrates a cross-sectional view of an exemplary resilient structure as may be used in the exemplary tire of FIGS. 1 and 2.

FIG. 4 is a perspective and partial cross-sectional view of the exemplary reinforced structure of FIGS. 2 and 3 with portions of various components removed for purposes of illustration.

FIGS. 5 and 6 are side views of portions of the exemplary resilient structure in FIGS. 1 through 4 in various states during use as further described herein.

FIG. 7 illustrates a perspective and cross-sectional view of another exemplary embodiment of a tire of the present invention incorporating an opposing pair of the resilient structures of FIGS. 3 through 6.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

"Axial direction" or the letter "A" in the figures refers to a direction parallel to the axis of rotation of for example, the annular band, tire, and/or wheel as it travels along a road surface.

"Radial direction" or the letter "R" in the figures refers to a direction that is orthogonal to axial direction A and extends in the same direction as any radius that extends orthogonally from the axial direction.

"Circumferential direction" or the letter "C" in the figures refers to a direction is orthogonal to axial direction A and orthogonal to a radial direction R.

"Radial plane" means a plane that passes perpendicular to the equatorial plane and through the axis of rotation of the wheel.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance. A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Referring now to FIG. 1, an elevation view of an exemplary embodiment of a tire 100 of the present invention as incorporated onto a hub 108 is shown. During use, tire 100 rotates about an axis of rotation X that is parallel to axial direction A. Tire 100 includes a plurality of deflectable, reinforced structures 102 that are arranged adjacent to each other along circumferential direction C. A cross-sectional view of tire 100 taken along lines 2-2 that includes a perspective view of an exemplary reinforced structure 102 is shown in FIG. 2, As shown, each structure 102 is configured as a spoke-like or web-like component that, for this exemplary embodiment, extends along radial direction R between a resilient, annular band 106 and a cylindrically-shaped hub 108. The construction of each composite structure 102 is basically identical.

Tire 100 can be incorporated onto e.g., a wheel, hub, or other component positioned within or at opening O to allow tire 100 to be e.g., mounted onto an axle or other component of a vehicle so that the vehicle may roll across a ground surface. By way of non-limiting examples, such vehicle may include a passenger vehicle, heavy duty truck, light duty truck, all-terrain vehicle, bus, aircraft, agricultural vehicle, mining vehicle, bicycle, motorcycle, and others. Tire 100 may be attached to e.g., hub 108 by use of e.g., adhesives, fasteners, and combinations thereof. In still other embodiments, tire 100 and hub 108 may be integrally formed together. Other hub or wheel configurations and constructions may be used as well.

An annular tread band 110 is incorporated with resilient annular band 106. Tread band 110 may be e.g., adhered to annular band 106 or may formed integrally with annular band 106. Tread band 110 has a plurality of ribs 134 providing an outer contact surface 112 for contact with the ground or other surfaces as tire 100 rolls across. The present invention is not limited to the tread pattern shown in the figures. A variety of shapes and configurations may be used for the tread pattern of tread band 110, which may include e.g., ribs, blocks, and combinations. In other embodiments, annular band 106 may be constructed entirely from tread band 110 or integrally with tread band 110.

Annular band 106 may include a plurality of reinforcing elements 114 that each extend along circumferential direction C around tire 100 within an elastomeric layer 118. For example, elastomeric layer 118 may be constructed from one or more rubber materials, polyurethanes, and combinations thereof. Reinforcing elements 114 may be e.g., cords or cables arranged along axial direction A in multiple rows 116 within layer 118.

In one exemplary embodiment, reinforcing elements 114 are "interlaced" with respect to each other along either radial direction R or axial direction A. Where reinforcing elements 114 are interlaced along axial direction A, imaginary lines extending between the center points of reinforcing elements 114 in adjacent, axially oriented rows 116 will form a rhombus or horizontal diamond having non-orthogonal angles between the sides of the rhombus. In this interlaced, horizontal diamond configuration, reinforcing elements 114 of adjacent, axially-oriented rows 116 are closer together than reinforcing elements 114 within the same axially-oriented row 116. Where reinforcing elements 114 are interlaced along radial direction R, imaginary lines extending between the center point of reinforcing elements 114 in adjacent, axially oriented rows 116 will form a rhombus or vertical diamond having non-orthogonal angles between the sides of the rhombus. In this interlaced, vertical diamond configuration, reinforcing elements 114 along the same, axially-oriented row will be closer together than reinforcing elements in non-adjacent, axially-oriented rows. As will be understood by one of skill in the art using the teachings disclosed herein, during manufacture of tire 100, a perfect positioning of reinforcing elements 114 into the shape of a vertical or horizontal diamond may not be possible due to e.g., the movement of materials during the manufacturing process. As such, slight displacements of the reinforcement elements of either diamond configuration can occur.

Reinforcing elements 114 can be constructed from a variety of materials. For example, reinforcing elements 114 can be constructed from metallic cables, or cables that are constructed from polymeric monofilaments such as PET (polyethylene terephthalate), nylon, or combinations thereof. By way of additional example, reinforcing elements 114 could be constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an "elastic deformation" means that the material will return approximately to its original state when the stress is released. By way of example, the fibers could be constructed from glass, certain carbon fibers of low modulus, and combinations thereof. Preferably, the thermoset resin has a glass transition temperature $T_g$ greater than 130° C. Advantageously, the initial modulus of extension of the thermoset resin is at least 3 GPa. Reinforcing elements 114 could also be constructed from combinations of PET and such elongate composite elements. Additionally, reinforcing elements 114 could be constructed from hollow tubes made from rigid polymers such as e.g., PET or nylon. Other materials may be used as well.

Resilient annular band 106 is configured to undergo deformation as tire 100 rolls across a ground surface and portions of band 106 pass through a contact patch where outer contact surface 112 makes contact with the ground surface. Through such deformation, annular band 106 can allow outer contact surface 112 to become planar in the contact patch. Annular band 106 with e.g., reinforcement elements 114 also provides strength to support and carry a nominal load applied to tire 100 through hub 108 or other means of attachment to a vehicle. As will be further described, such nominal load may be applied to annular band 106 through compression, tension, or both, of reinforced structures 102.

As tire 100 rolls across e.g., a ground surface, multiple structures 102 near the contact patch may flex under compression as the outer contact surface 112 passes through the contact patch. Structures 102 located elsewhere may also incur deflections but the greatest deflection of structures 102 will likely occur near the contact patch. At the same time, other resilient structures 102 located at portions along tire 100 away from the contact patch—such as e.g., opposite to the contact path —may also flex under tension.

FIG. 3 provides a cross-sectional view of the exemplary reinforced structure 102 while FIG. 4 is another perspective view of structure 102 but with portions of various components removed to reveal certain features as further described herein. For this exemplary embodiment, the cross-sectional profile in FIG. 3 is continuous along axial direction A as structure 102 extends axially over tire 100 from side 96 to opposing side 98 (FIG. 2) of tire 100.

Each structure 102 includes a radially-outer joint 122 and a radially-inner joint 120. As shown, joints 120 and 122 are spaced apart from each other along radial direction R with joint 120 being radially inward of joint 122. By way of example, joint 120, 122 may each be constructed from an elastomeric material that extends continuously along axial direction A of tire 100.

For this exemplary embodiment, along one side, radially-outer joint 122 includes a radially-outer connecting surface 130 (FIG. 3) that is continuous along axial direction A and has a width along circumferential direction C. As best seen in FIG. 3, surface 130 is slightly convex or curved along circumferential direction C for this embodiment. Connecting surface 130 can be incorporated with a first component of a tire such as e.g., resilient annular band 106. For example, connecting surface 130 can be adhered (e.g., using a cyanoacrylate adhesive), bonded, mechanically connected, and/or integrally formed with annular band 106. In other embodiments, radially-outer joint 122 may be incorporated with e.g., tread band 110, annular band 106, or combinations thereof.

Similarly, along an opposing side, radially-inner joint 120 includes a radially-inner connecting surface 128. For this exemplary embodiment, connecting surface 128 is also continuous along axial direction A and has a width along circumferential direction C. As best seen in FIG. 3, surface 128 is slightly concave or curved along circumferential direction C for this embodiment. Connecting surface 128 can be e.g., incorporated with a second component of a tire such as e.g., hub 108. For example, connecting surface 128 can be adhered, bonded, mechanically connected, and/or integrally formed with hub 108. In other embodiments, radially-inner joint 120 may be incorporated with e.g., hub 108, a wheel, or combinations thereof.

In one exemplary aspect of the invention, joint 120 and/or 122 may be connected with other components of tire 100 (e.g., with hub 108 or annular band 106) by creating such components from uncured rubber and then curing the rubber components together to form an integral construction. Similarly, in another exemplary aspect, one or more strips of green rubber could be placed between cured or partially cured components and used to cure them together.

In another exemplary aspect of the invention, joints 120 and 122 are constructed from a relatively soft rubber. In one exemplary embodiment, a rubber having a modulus in the range of 1 MPa to 10 MPa can be used. In still another embodiment, a rubber having a modulus of about 4.8 MPa may be used.

A support membrane 104 extends continuously from radially-inner joint 120 to radially-outer joint 122 and between opposing sides 96 and 98. Support membrane 104 includes a radially-inner end 136 that is adjacent to radially-inner joint 120 and is positioned radially outward of radially-inner joint 120. Radially-inner end 136 is connected to radially-inner joint 120. For this exemplary embodiment, radially-inner end 136 is not connected to hub 108, and radially-inner joint 120 is positioned between radially-inner end 136 and hub 108.

Support membrane 104 also includes a radially-outer end 138 that is adjacent to radially-outer joint 122 and is positioned radially inward of radially-outer joint 122. Radially-outer end 138 is connected to radially-outer joint 122. For this exemplary embodiment, radially-outer end 138 is not connected to annular band 106, and radially-outer joint 122 is positioned between radially-outer end 138 and annular band 106.

In one exemplary aspect, support membrane 104 has an arcuate shape as viewed along axial direction A. The arcuate shape extends between radially-inner end 136 and radially-outer end. When not supporting a nominal load, support membrane 104 may have a smooth radius of curvature $SM_{RC}$ (FIG. 3) between radially-inner end 136 and radially-outer end 138. The magnitude for radius of curvature $SM_{RC}$ will depend on e.g., the overall size of tire 100, the height along radial direction R of each support 102, and other variables.

Referring to FIGS. 3 and 4, support membrane 104 includes a plurality of reinforced layers separated by a non-reinforced, elastomeric shear layer between each of the reinforced layers. The reinforced layers have lower modulus than the non-reinforced elastomeric shear layer therebetween. For example, support membrane 104 includes a reinforced layer 124 and a reinforced layer 126 separated by a non-reinforced, elastomeric shear layer 132 (providing a total of three layers for support membrane 104). In other embodiments of the invention, support membrane 104 may include a different number of such layers. For example, support membrane may include three reinforced layers 124 where each pair of reinforced layers is separated by a non-reinforced, elastomeric shear layer 132 (providing a total of five layers for support membrane 104).

Resilient structures 102, including support membrane 104 may be constructed and reinforced in a manner that provides a desired flexural rigidity such that each may deform resiliently as structures 102 are placed under e.g., tension and compression during operation of tire 100. For example, support membrane 104 may be constructed to have a flexural rigidity of approximately 140,000 N-mm$^2$ as may be measured e.g., by ASTM D709. Other values may be used as well.

To meet the mechanical properties required for resilient structure 102 including the appropriate flexural rigidity, different constructions may be used for the reinforced layers. For this exemplary embodiment, each reinforced layer 124 and 126 includes a plurality of elongate reinforcements 144 and 146, respectively. With each layer 124, 126, such reinforcements are positioned adjacent to each other along axial direction A and extend continuously along radial direction R from radially-inner end 136 to radially-outer end 138. Reinforcements 144 may be surrounded within an elastomeric material forming part of reinforced layer 124. Similarly, reinforcements 146 may be surrounded within an elastomeric material forming part of reinforced layer 126.

In one exemplary aspect, elongate reinforcements 144 may have a diameter of about 1 mm and may be spaced apart from each other along axial direction A at a pace of about 2 mm as measured at radially inner end 136 or radially outer end 138. Other pacings and diameters may be used as well.

In certain exemplary embodiments, reinforcements 144, 146 may be e.g., constructed from filaments formed by pultrusion of a glass reinforced resin. The filaments may have a modulus in the range of 10 GPa to 100 GPa. In still another embodiment, the filaments may have a modulus e.g., approximately 40 GPa. Other materials for construction of reinforcements 144,146 may be used as well including e.g., carbon fiber such as graphite epoxy, glass epoxy, aramid reinforced resins or epoxy, and combinations thereof. Fiber-reinforced plastic reinforcements 144, 146 or metallic reinforcements 144, 146 may also be used provided such have sufficient flexural rigidity for the nominal loads to be supported by tire 100.

In still another embodiment, reinforced layers 124, 126 of support membrane 104 could be constructed as a fiber reinforced plastic. For example, reinforced layers 124, 126 could each be constructed as a layer of fiberglass reinforced resin where the fiberglass is formed of e.g., filaments created by pultrusion of a glass reinforced resin. The filaments may have a modulus in the range of 10 GPa to 100 GPa. In still another embodiment, the filaments may have a modulus e.g., approximately 40 GPa.

Radially-outer end 138 of support membrane 104 is attached to radially-outer joint 122 and is allowed to compress or stretch radially-outer joint 122 during operation of tire 100. Similarly, radially-inner end 136 of support membrane 104 is attached to radially-inner joint 120 and is allowed to compress or stretch radially-inner joint 120 during operation of tire 100.

Each resilient structure 102 may have an opposing pair of coverings or outer layers 148, 150 made of a rubber or other elastomeric material. Outer layers 148, 150 on opposing sides 140, 142 of the support membrane 104 of each resilient structure 102. In one exemplary aspect, coverings 148, 150 may each have a modulus of approximately 5 MPa.

As shown, joints 120 and 122 are both located on one of the opposing sides 142 of support membrane 104. Stated alternatively, joints 120 and 122 are each located on side 142.

Referring now to FIGS. 6 and 7 (elastomeric covering 148,150 is not shown for purposes of illustration), during operation of tire 100 as it rolls across a surface, some structures 102 may be placed in compression while other structures 102 may be placed in tension. The dashed lines of FIG. 6 illustrate a structures 102 undergoing compression while the dashed lines of FIG. 7 illustrate a structure 102 undergoing tension.

While not intending to be bound to any particular theory, the action of structures 102 during operation of tire 100 will now be described. During compression as depicted in FIG. 6, structure 102 is deformed or flexed radially inward (towards the axis of rotation X). Radially-outer joint 122 undergoes highest compression along a radially-innermost portion nearest side 142 and undergoes lowest compression or tension on an opposing, radially-outermost portion nearest side 140. Similarly, during compression, radially-inner joint 120 undergoes compression along a radially-innermost portion nearest side 142 and undergoes tension on an opposing, radially-outer most portion nearest side 140.

Conversely, during tension as depicted in FIG. 7, structures 102 are deformed or flexed radially outward (away from the axis of rotation X). In such state, radially-outer joint 122 undergoes highest tension along a radially-inner most portion nearest side 142 and undergoes lowest tension or compression on an opposing, radially-outer most portion nearest side 140. Similarly, during tension, radially-inner joint 120 undergoes highest tension along a radially-outermost portion nearest side 142 and undergoes lowest tension or compression on an opposing, radially-innermost portion nearest side 140.

For the embodiment shown, support membrane 104 of each support structure 102 is not connected directly to hub 108 or annular band 106. During compression (FIG. 6), the distance along radial direction R between radially-inner end 136 and 138 can decrease as ends 136 and 138 move closer together. During tension (FIG. 7), the distance along radial direction R between radially-inner end 136 and 138 can increase as such ends move apart. In each such case, support membrane 104 acts somewhat like a hinge so that distance between ends 136 and 138 may change as tire 100 rolls across a surface and structures 102 rotate into, and out of, proximity to the contact patch.

FIG. 7 provides another exemplary embodiment of a tire 100 of the present invention. For this embodiment, tire 100 includes an opposing pair of resilient structures 102 positioned on sides 96 and 98. Each opposing structure extends continuously along circumferential direction C and provides a convex outer surface for side 96 or side 98 of tire 100. Similarly, for each structure 102, the support membrane 104 and joints 120,122 extend continuously along circumferential direction C.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A resilient, composite structure for connecting with components of a tire; the tire defining axial, radial, and circumferential directions; the composite structure comprising:

a radially-outer joint for connecting with a first component of a tire;

a radially-inner joint for connecting with a second component of a tire;

a support membrane extending continuously from the radially-outer joint and the radially-inner joint, the support membrane having a radially-outer end that is located radially inward of the radially-outer joint, the support membrane having a radially-inner end that is located radially outward of the radially-inner joint, the support membrane defining a pair of opposing sides along the circumferential direction, the support membrane having an arcuate shape that extends continuously from the radially-outer joint to the radially-inner joint; and wherein the radially-inner joint and the radially-outer joint are movable relative to each other so as to allow bending of the support membrane, and wherein the radially-inner support and the radially-outer joint are both located on one of the opposing sides of the pair of opposing sides of the support membrane.

2. The resilient, composite structure of claim 1, wherein the support membrane comprises a plurality of reinforced layers separated by a non-reinforced, elastomeric shear layer in between each of the reinforced layers.

3. The resilient, composite structure of claim 2, wherein the reinforced layers have a lower modulus than the non-reinforced elastomeric shear layer between the reinforced layers.

4. The resilient, composite structure of claim 3, wherein each reinforced layer comprises a plurality of elongate reinforcements positioned adjacent to each other and extending continuously along the radial direction from the radially-inner end to the radially-outer end of the support membrane.

5. The resilient, composite structure of claim 4, wherein each reinforced layer comprises an elastomeric material surrounding the plurality of elongate reinforcements.

6. The resilient, composite structure of claim 3, wherein each reinforced layer comprises a fiber reinforced plastic.

7. The resilient, composite structure of claim 6, further comprising an elastomer surrounding the fiber reinforced plastic.

8. The resilient, composite structure of claim 1, wherein the radially-outer end of the support membrane is not connected to the first component.

9. The resilient, composite structure of claim 1, wherein the radially-inner end of the support membrane is not connected to the second component.

10. The resilient, composite structure of claim 1, wherein the radially-outer joint is positioned between the radially-outer end of the support membrane and the first component.

11. The resilient, composite structure of claim 1, wherein the radially-inner joint is positioned between the radially-inner end of the support membrane and the second component.

12. The resilient, composite structure of claim 1, wherein the radially-inner joint and the radially-outer joint each compromise an elastomeric material.

13. The resilient, composite structure of claim 1, wherein the first component is an annular band, and wherein the radially-outer joint defines a radially-outer connecting surface incorporated with the annular band of the tire.

14. The resilient, composite structure of claim 1, wherein the support membrane, radially-inner joint, and radially outer joint extend continuously between opposing sides of the tire.

* * * * *